Aug. 19, 1958 H. D. DRAIN 2,847,875
SPEED RESPONSIVE DEVICE FOR AUTOMOBILES
Filed Sept. 28, 1955 2 Sheets-Sheet 2
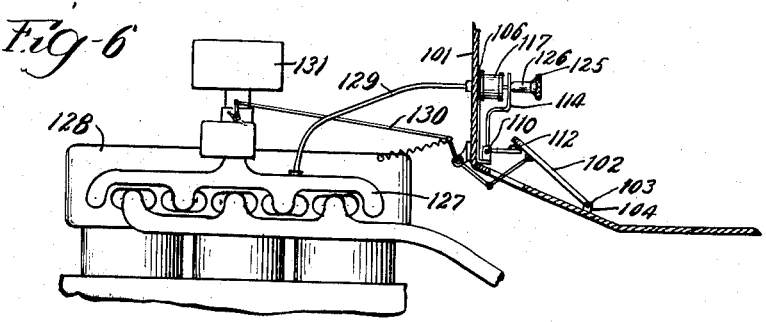
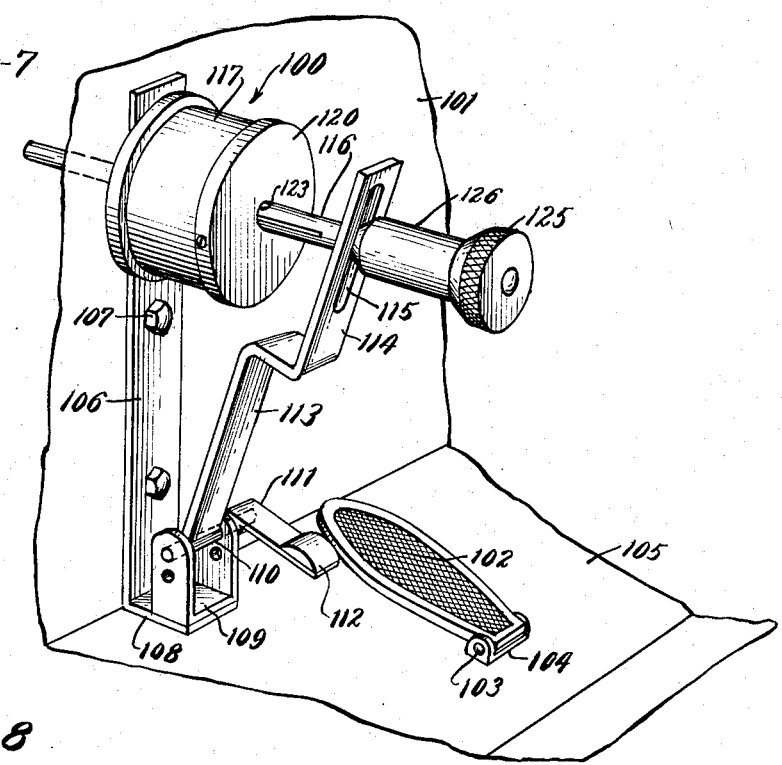
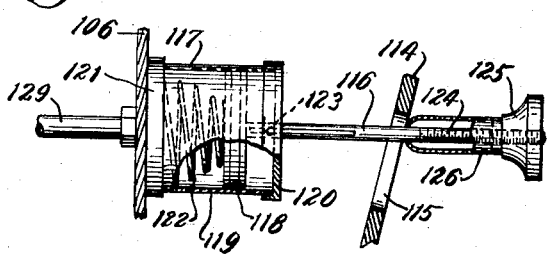
INVENTOR.
Herbert D. Drain
BY
Cromwell, Greist & Warden
Attys.

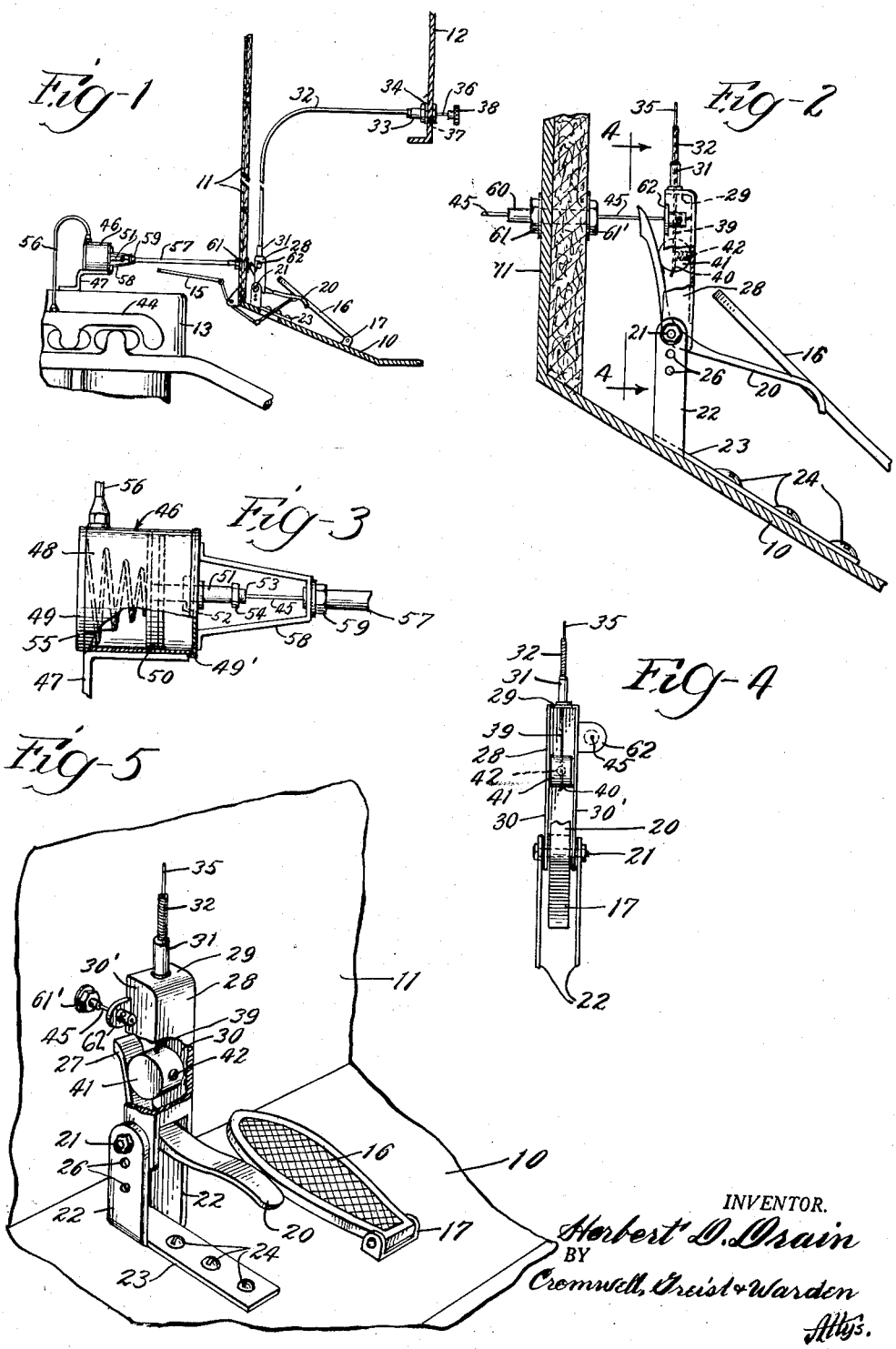

United States Patent Office 2,847,875
Patented Aug. 19, 1958

2,847,875

SPEED RESPONSIVE DEVICE FOR AUTOMOBILES

Herbert D. Drain, Elmhurst, Ill.

Application September 28, 1955, Serial No. 537,206

14 Claims. (Cl. 74—526)

This invention relates to speed controlling or limiting apparatus for vehicles and is more particularly concerned with a simple and efficient control device for automobiles or like vehicles which are equipped with an internal combustion engine controlled by the operation of a foot pedal or accelerator.

It is well known that after the driver of an automobile has driven for a period of time he loses to a large degree his ability to correctly judge the speed of the vehicle so that a relatively high speed appears to him to be moderate. In other words, unless constant attention is given to the speedometer, it is very natural for a driver to continually speed up the car so that he is likely to exceed the speed limits in different zones of travel.

Various speed limiting devices have heretofore been provided to prevent the driver from exceeding a predetermined maximum speed but these have not been generally acceptable to the ordinary driver principally because of the difficulty of changing or adjusting the speed limit to which the device is set and because it has not been possible to render the device ineffective in the case of emergency as, for example, when for an instant or short interval a higher speed and greater power than that permitted by the device is required to get out of the way of another car or to pass another car.

It is a general object of the present invention to provide a safety device which will enable the driver of a vehicle to keep the vehicle within a predetermined speed limit while at the same time it will permit the driver to readily adjust the device for any desired speed limit and also permit the driver to render the device instantly ineffective so that he is able to operate the car without regard to the same.

It is a more specific object of the invention to provide a simple and efficient apparatus for attachment to a driven vehicle which is equipped with an internal combustion engine having its fuel supply controlled by the operation of a foot pedal wherein the apparatus includes a movably mounted member positioned adjacent the foot pedal for engagement simultaneously with the pedal by the foot of the operator and a connecting mechanism between the movably mounted member and the intake manifold of the engine whereby the position of the movable member relative to the foot pedal is changed in accordance with variations in the vacuum in the intake manifold during the operation of the engine.

It is a further object of the invention to provide an attachment for a vehicle which is propelled by an internal combustion engine and controlled by a foot pedal, which comprises a pivoted foot rest located immediately adjacent the foot pedal, mechanism connecting the foot rest with a piston which is reciprocably mounted in a vacuum chamber having a connection with the intake manifold of the engine so that the foot rest will move relative to the foot pedal in response to changes in the vacuum in the intake manifold, and mechanism for adjusting the relative position of the foot rest and the mechanism connecting the same with the piston in the vacuum chamber whereby the operator of the vehicle is enabled to initially adjust the position of the foot rest so that it will be automatically moved to the proper location relative to the foot pedal by changes in the vacuum in the intake manifold to enable the operator to maintain the speed of the vehicle within a predetermined limit.

It is another object of the invention to provide a safety device for enabling the operator of a motor driven vehicle to maintain control of the speed of the motor without exceeding a predetermined speed limit which comprises a swingably mounted foot rest mounted adjacent the accelerator pedal in a position to be engaged by the foot of the operator simultaneously with the engagement of the accelerator pedal, a vacuum chamber connected to the intake manifold of the motor, a piston in the chamber which is moved in response to the variations in the vacuum in the motor, a connection between the piston and the foot rest which causes the latter to move relative to the accelerator pedal in response to variations in the vacuum and mechanism for adjusting the initial position of the foot rest relative to the connection between the same and the piston which adjusting mechanism is within easy reach of the operator.

These and other objects and advantages of the invention will be apparent from a consideration of the several forms of the apparatus which are shown by way of illustration in the accompanying drawings wherein:

Fig. 1 is a side elevation of one form of the apparatus which embodies therein the principal features of the invention and which is illustrated as installed in an automobile;

Fig. 2 is a side elevation, to an enlarged scale and with portions broken away, of that portion of the apparatus which is located adjacent the fuel control pedal;

Fig. 3 is a side elevation, to an enlarged scale and with portions broken away, of the vacuum cylinder and the associated apparatus;

Fig. 4 is an elevation taken on the line 4—4 of Fig. 2;

Fig. 5 is a perspective view of the apparatus which is shown in Fig. 2;

Fig. 6 is a side elevation of a modified form of the apparatus, the apparatus being shown installed in a vehicle;

Fig. 7 is a perspective view, to an enlarged scale and with portions broken away, of the portion of the apparatus shown in Fig. 4 which is located adjacent the fuel control pedal; and Fig. 8 is a side elevation to an enlarged scale with portions broken away of the vacuum cylinder and its associated apparatus.

Referring first to Figs. 1 to 5 of the drawings, a form of the apparatus is illustrated which is adapted to be mounted in a conventional automobile having an upwardly inclined floor board structure 10 which terminates at a forward partition or fire wall 11, both the floor board and the fire wall being located below a dash board 12. The vehicle is driven by a gasoline motor or engine 13 which is separated from the driver's compartment by the floor board 10 and the fire wall 11. The engine 13 is provided with the usual carburetor 14 having fuel feed controls 15 which are connected with a foot pedal 16. The fuel controlling foot pedal or accelerator 16 is pivotally mounted by means of a suitable bracket 17 on the floor board 10 and is adapted to swing forwardly and downwardly towards the latter by pressure of the operator's foot on the same to control the supply of fuel to the carburetor through the connections 15 between the same.

A foot rest or limit stop member 20 is provided adjacent the end of the foot pedal 16 which is mounted for pivotal movement on a pivot pin 21 supported in the upright laterally spaced arms 22 of a bracket 23 which is attached by bolts 24 or equivalent fastening means to the floor board 10. The spaced or bifurcated arm members 22 which provide a trunnion support for the pivot pin 21 are provided with aligned vertically spaced apertures 26 in the upper ends thereof for adjusting the height of the pivot pin 21. The foot rest or stop member 20 has an upwardly projecting arm 27 which is held in predetermined position relative to a vertical plane by an adjusting apparatus which permits the operator to readily control the initial location of the foot rest 20 relative to the fuel control pedal 16.

The apparatus for adjusting the position of the foot rest 20 relative to the pedal 16 consists of a member 28 having a generally U-shaped or channel shaped cross section which is pivotally mounted at its lower end on the pivot pin 21 and extends upwardly therefrom with the open face thereof toward the fire wall 11. The upper end of channel member 28 is closed by a cross wall 29 which extends between the side walls or flanges 30, 30' and is connected by means of a suitable nipple 31 with a flexible cable casing 32, the latter extending to the dash board 12 and being connected to the rear face thereof by the threaded nipple 33 which is secured by a nut or other fastener 34. An adjusting wire or cable 35 is carried in the casing 32 with its upper end 36 projecting through an aperture 37 in the dash 12 and receiving a control knob 38 which permits manual rotation of the control cable 35. The lower end 39 of the cable 35 is secured in an aperture 40 in an adjusting member 41 by a set screw 42. The adjusting member 41 is in the form of a short rod-like section and is positioned in sliding relation between the side walls 30, 30' of the channel member 28 so that it is movable therein in a vertical direction. The member 41 engages the upstanding arm 27 of the foot rest 20 and determines the relative position of the latter with respect to the foot pedal 16, the foot rest 20 being balanced to hold the arm 27 against the adjusting member 41.

The channel member 28 is adapted to be swung about the pivot pin 21 in response to variations in the vacuum in the intake manifold 44 of the engine 13. This is accomplished by means of a control cable or wire 45 which extends between the channel member 28 and a vacuum cylinder 46, the latter being mounted by means of a suitable bracket 47 on the head of the motor 13 or on any other convenient fixed portion of the vehicle.

The vacuum cylinder 46 comprises a tubular section 48 forming a chamber which is closed at both ends by cap members 49 and 49' and in which there is mounted a piston head 50. The piston head 50 is provided with a stem 51 extending through a suitable aperture 52 in the end wall or cap member 49' of the cylinder 46, which stem 51 has attached to its outer end the end 53 of the cable 45 by a fastener member 54. The piston head 50 is urged towards the end wall member 49 by a compression spring 55 which extends between the piston head 50 and the end wall member 49. The cylinder 46 is connected by a vacuum line 56 with intake manifold 44 of the motor 13 so that variations in the vacuum in the intake manifold 44 result in movement of the piston head 50 against the action of the spring 55.

The cable or wire 45 is carried in a casing 57 which extends between the U-shaped bracket 58 on the wall 49' of the vacuum cylinder 46 and the fire wall 11. The casing 57 is secured to the bracket 58 by a suitable fitting 59 and to the fire wall by a tubular threaded fitting 60 and clamp nuts 61, 61', the fitting extending through the wall 11. The control wire or cable 45 is secured at its other end to an L-shaped ear 62 fastened on the side wall 30' of the channel member 28 so that the member 28 moves in response to movements of the piston head 50.

With the arrangement shown the operator of the vehicle may adjust the initial position of the foot rest or stop member 20 by manipulating the control knob 38 on the dash board 12, to obtain the speed desired. Thereafter the foot rest 20 will pivot about the axis 21 to bring the free end thereof up or down in response to the vacuum in the intake manifold which varies with the load requirements on the engine. The operator is able to depress the foot pedal 16 to increase the speed of the motor until his foot strikes the foot rest 20 which will be held by the vacuum in the cylinder 46 at the position required to bring the motor up to the minimum speed for which the foot rest 20 is initially adjusted. The use of the foot rest 20 may, of course, be entirely eliminated by the operator of the vehicle merely moving his foot to the opposite side of the foot pedal 16 so that he is able to depress the pedal 16 without his foot striking the foot rest 20. This permits the operator to quickly increase the speed of the vehicle, when it is desired as in the case of emergency conditions. Otherwise, the foot rest 20 will prevent the operator from depressing the accelerator pedal 16 beyond the point which will cause the vehicle to exceed the maximum speed for which the foot rest 20 is set.

A modified form of the device is illustrated in Figs. 4 to 6, in which the entire apparatus 100 is supported on the partition or fire wall 101 of the vehicle adjacent the foot pedal or accelerator 102, the latter being mounted on a pivot 103 supported in a bracket 104 secured to the floor board 105 of the vehicle. The apparatus 100 comprises a vertically extending supporting bracket 106 which is secured to the fire wall 101 by bolts or other fastening elements 107. At its lower end the bracket 106 has an inwardly extending angle arm 108 which supports an upwardly opening U-shaped bearing bracket 109 having a pivot pin 110 journalled in the upstanding laterally spaced arms thereof. The pivot pin 110 has one end thereof extended toward the foot pedal 102. The extended end 111 of the pivot pin 110 carries a foot rest or stop member 112 which is secured thereto and extends forwardly along the side of the forward end of the foot pedal 102. The pivot pin 110 has an upstanding bracket arm 113 secured thereto. The bracket arm 113 has an offset upper end portion 114 provided with a slot 115 for receiving a control wire or cable member 116. The control member 116 projects from the vacuum cylinder or casing 117 which is secured on the upright arm of the bracket 106 and constitutes the stem of a piston having a head portion 118 which is operable in the vacuum cylinder 117. The vacuum cylinder 117 (Fig. 6) comprises a hollow cylindrical body section 119 and forward and rear cap or wall members 120 and 121, the latter being secured by suitable fastening elements to the supporting bracket 106. The piston head 118 operates against a compression spring 122 which extends within the cylindrical body 119 between the end of the piston head 118 and the end wall member 121. The inner end wall member 120 is apertured at 123 to accommodate the stem member 116 which extends through the slot 115 in the bracket member 114 and is provided with a threaded end portion 124 on which there is received a control knob 125 and a spacer member 126, the latter extending between the control knob 125 and the rear face of the bracket member 114. The knob 125 may be rotated to vary the position of the bracket member 114 and through the pivot pin 110, to which both are fixed, the position of the foot rest 112 relative to the accelerator pedal 102.

The vacuum cylinder 117 is connected to the intake manifold 127 of the vehicle power plant or engine 128 by a line 129 which extends through a suitable aperture in the fire wall 101 and the bracket arm 106 and connects the vacuum chamber within the cylinder 117 with the intake vacuum so that variations in the vacuum in the intake manifold 127 are effective on the piston head 118 to move the latter in the cylinder 117 and thus control the movement of the foot rest 112 relative to the accelerator pedal 102. The accelerator pedal 102 is, of course, connected by a suitable linkage 130 with the fuel feed control on the carburetor 131 of the engine 128.

The operation of the modified form of the apparatus is the same as the operation of the previously described form of the apparatus. The operator of the vehicle is enabled to adjust the foot rest 112 for the speed desired by rotating the control knob 125 on the end of the control member 116 and thus positioning the foot rest 112 at the proper location relative to the accelerator pedal 102 so that it will be engaged by the foot of the operator when the pedal is depressed sufficiently. The use of the apparatus may be readily discontinued by the operator moving his foot so that it does not contact the foot rest 112 but is free to depress the pedal 102 as desired for emergency operation.

While specific materials and particular details of construction have been referred to in describing the illustrated forms of the invention, it will be understood that other materials and other details of construction may be resorted to within the spirit of the same.

I claim:

1. A speed limiting apparatus for a motor driven vehicle wherein the speed of the vehicle is normally controlled by a foot pedal located within reach of the foot of the driver which controls the feed of the fuel to the motor, said apparatus comprising a stop member movably mounted adjacent the foot pedal where it may be engaged by the foot while the foot engages simultaneously with the pedal, and means for varying the position of the stop member which includes a chamber having a piston mounted therein, a vacuum line connecting the chamber and the manifold of the motor whereby the piston moves in said chamber in response to variations in the vacuum in the manifold, and means connecting the stop member with the piston for imparting movement to the stop member in response to movements of the piston.

2. A speed limiting apparatus as recited in claim 1 and means for adjusting the position of the stop member relative to the piston.

3. An apparatus for use on a motor driven vehicle wherein the speed of the vehicle is controlled by a foot pedal located within reach of the foot of the driver which is operable by downward pressure of the driver's foot to feed fuel to the motor, said apparatus comprising a stop member swingably mounted adjacent the foot pedal where it may be engaged by the driver's foot while the latter engages the foot pedal, means forming a vacuum chamber, a piston head mounted for reciprocating movement in said vacuum chamber, a vacuum line connecting the chamber and the manifold of the motor whereby the piston head moves in said chamber in response to variations in the vacuum in the manifold, and a connection between the stop member and the piston head whereby the position of the stop member relative to the foot pedal is adjusted in response to movements of the piston head to limit the downward movement of the driver's foot in the direction to increase the speed of the vehicle.

4. An apparatus as recited in claim 3 and means for adjusting the initial position of the stop member relative to the connection between the stop member and the piston head.

5. An apparatus for enabling the driver to limit the speed of a motor driven vehicle having a foot pedal which is located within reach of the foot of the driver for controlling the feed of the fuel to the motor, said apparatus comprising an angular stop member pivotally mounted adjacent the foot pedal with one arm thereof positioned for engagement by the foot while the foot is in position for engaging the foot pedal, means forming a vacuum chamber, a piston head in said chamber which is movable in response to changes in the vacuum in said chamber, a vacuum line connecting the vacuum chamber and the manifold of the motor, and a link means connecting the other arm of said stop member with the piston head for imparting pivotal movement to the stop member in response to movements of the piston head.

6. A speed limiting apparatus for a motor driven vehicle wherein the speed of the vehicle is controlled by a foot operated fuel control pedal located within reach of the foot of driver, said apparatus comprising a stop member movably mounted adjacent the fuel control pedal where it may be engaged by the driver's foot while the latter engages the fuel control pedal, and means for varying the position of the stop member relative to the fuel control pedal in accordance with variations in the vacuum in the manifold of the motor whereby the fuel feeding movement of the driver's foot is limited by the position of the stop member.

7. A speed limiting apparatus as recited in claim 6 and means independent of the vacuum in the manifold for adjusting the position of the stop member relative to the fuel control pedal.

8. Apparatus for enabling the driver of a motor vehicle to avoid exceeding a predetermined vehicle speed, the vehicle having a foot operated pedal located within reach of the foot of the driver which controls the feed of the fuel to the motor, said apparatus comprising a stop member movably mounted at one side of the foot pedal where it may be engaged by the driver's foot as the latter engages and depresses the fuel control pedal, and means for varying the position of the stop member which includes a vacuum chamber connected to the manifold of the vehicle motor, a member in said vacuum chamber which is movable in response to variations in the vacuum in the manifold and a connection between said stop member and the movable member in said vacuum chamber whereby the stop member is moved in response to variations in the vacuum in the manifold.

9. Apparatus as recited in claim 8 and means for initially adjusting the position of the stop member relative to the movable member in the vacuum chamber.

10. An apparatus for use on a motor driven vehicle wherein the speed of the vehicle is controlled by a foot pedal located within reach of the foot of the driver which is operable by downward pressure of the driver's foot to feed fuel to the motor, said apparatus comprising a stop member pivotally mounted adjacent the foot pedal where it may be engaged by the driver's foot as the latter engages and depresses the foot pedal, means forming a vacuum chamber, a piston head mounted for reciprocating movement in said vacuum chamber, a vacuum line connecting the chamber and the manifold of the motor whereby the piston moves in said chamber in response to variations in the vacuum in the manifold, and a flexible wire connection between the stop member and the piston head whereby the position of the stop member relative to the foot pedal is adjusted in response to movements of the piston head to limit the downward movement of the driver's foot in the direction to increase the speed of the vehicle.

11. An apparatus as recited in claim 10 and means for adjusting the initial relation of the stop member and the wire connection to set the stop member for engagement by the driver's foot at a predetermined vehicle speed.

12. Apparatus for enabling the driver of a motor powered accelerator pedal controlled vehicle to limit the speed thereof, comprising an angular member supported on a pivot member at one side of the accelerator pedal with one arm thereof extending to a point adjacent the pedal so that it may be engaged by the driver's foot as the latter engages and depresses the pedal, and with the other arm extending upwardly of the pivot member, means connected to the drive motor for reciprocation in response to variations in the vacuum in the motor, and means connecting said reciprocating means with the upwardly extending arm of said angular member for swinging said angular member about said pivot member whereby the position of the arms of said angular member which extends adjacent the accelerator pedal is automatically adjusted in accordance with the speed of the vehicle.

13. A speed limiting apparatus for a motor driven vehicle wherein the speed of the vehicle is normally controlled by an accelerator pedal located within reach of the foot of the driver, said apparatus comprising a stop member movably mounted on a pivot supported adjacent the foot pedal where it may be engaged by the foot as the foot engages and depresses the pedal, an arm extending from said pivot, a vacuum chamber having a piston mounted therein, a vacuum line connecting the chamber and the motor whereby the piston moves in said chamber in response to variations in the vacuum in the motor, and means connecting said arm with the piston for imparting movement to the stop member in response to movements of the piston.

14. A speed limiting apparatus as recited in claim 13, and means for adjusting the connecting means between said arm and said piston to initially adjust the position of the stop member relative to the piston and the accelerator pedal.

References Cited in the file of this patent

UNITED STATES PATENTS

| | | |
|---|---|---|
| 850,507 | Waldon | Apr. 16, 1907 |
| 1,235,423 | Boyett | July 31, 1917 |
| 1,385,213 | Kline | July 19, 1921 |
| 1,704,505 | Kampman | Mar. 5, 1929 |
| 1,788,713 | Good et al. | Jan. 13, 1931 |
| 2,124,683 | Abele | July 26, 1938 |
| 2,224,249 | Boldt | Dec. 10, 1940 |
| 2,342,751 | Patrick | Feb. 29, 1944 |